(12) United States Patent
Chen (10) Patent No.: US 12,430,441 B2
(45) Date of Patent: Sep. 30, 2025

(54) DATA PROCESSING SYSTEM CAPABLE OF PREVENTING SYSTEM TIME FROM BEING TAMPERED IN OFF-LINE STATUS

(71) Applicant: TrustONE Security Inc., Taipei (TW)

(72) Inventor: Ting-Huang Chen, Keelung (TW)

(73) Assignee: TRUSTONE SECURITY INC., Taipei (TW)

( * ) Notice: Subject to any disclaimer, the term of this patent is extended or adjusted under 35 U.S.C. 154(b) by 180 days.

(21) Appl. No.: 18/495,419

(22) Filed: Oct. 26, 2023

(65) Prior Publication Data

US 2024/0160741 A1    May 16, 2024

(30) Foreign Application Priority Data

Nov. 16, 2022   (TW) .................................. 111143758

(51) Int. Cl.
*G06F 21/57* (2013.01)
*G06F 21/55* (2013.01)

(52) U.S. Cl.
CPC .......... *G06F 21/572* (2013.01); *G06F 21/554* (2013.01)

(58) Field of Classification Search
CPC .... G06F 21/554; G06F 21/566; G06F 21/552; G06F 21/57; G06F 21/55; G06F 21/52;

(Continued)

(56) References Cited

U.S. PATENT DOCUMENTS

| | | | |
|---|---|---|---|
| 5,040,158 A | * | 8/1991 | Lee .......................... G04G 7/00 368/10 |
| 7,890,569 B1 | * | 2/2011 | Stahl ..................... H04L 67/535 709/202 |

(Continued)

FOREIGN PATENT DOCUMENTS

| | | | | |
|---|---|---|---|---|
| CN | 105046115 A | * | 11/2015 | ........... G06F 21/121 |
| CN | 107329519 A | * | 11/2017 | ............... G06F 1/14 |
| CN | 114401065 A | * | 4/2022 | |

OTHER PUBLICATIONS

Zhang, Xu et al. CN 114401065 A (Description, machine translation), published Apr. 26, 2022. (Year: 2022).*

(Continued)

*Primary Examiner* — Michael Simitoski
(74) *Attorney, Agent, or Firm* — MUNCY, GEISSLER, OLDS & LOWE, P.C.

(57) ABSTRACT

A data processing system in an off-line status includes a BIOS device and at least one processor. The BIOS device is for calculating a current system time. The at least one processor executes an operating system. The operating system includes a time logging driver resident in a driver layer of the operating system and an application layer start/end time recording process resident in an application layer of the operating system. The time logging driver records a driver start time and a driver end time. The application layer start/end time recording process records an application layer start time and an application layer end time. The data processing system of the invention, according to the application layer start time, the application layer end time, the driver start time and the driver end time, adjusts the current system time to prevent the current system time from being tampered.

8 Claims, 6 Drawing Sheets

(58) Field of Classification Search
CPC .. G06F 21/50; G06F 11/3003; G06F 11/3055; G06F 2221/2101; G06F 2221/033; G06F 2221/034
See application file for complete search history.

(56) References Cited

U.S. PATENT DOCUMENTS

| | | | |
|---|---|---|---|
| 9,032,258 B2* | 5/2015 | Knight | G06F 11/0739 |
| | | | 714/55 |
| 9,361,243 B2* | 6/2016 | Shaath | G06F 16/176 |
| 2004/0040013 A1* | 2/2004 | Kalra | G06F 11/362 |
| | | | 714/E11.21 |
| 2007/0143462 A1* | 6/2007 | Venkatachalam | G06F 21/554 |
| | | | 709/223 |
| 2008/0104701 A1* | 5/2008 | Peacock | G06F 21/725 |
| | | | 726/22 |
| 2020/0012803 A1* | 1/2020 | Mannan | G06F 21/6218 |
| 2020/0162441 A1* | 5/2020 | Kobayashi | H04L 63/205 |
| 2020/0364342 A1* | 11/2020 | Martinez | G06F 9/441 |

OTHER PUBLICATIONS

Wu, Xiao-long et al. CN 105046115 A (Description, machine translation), published Nov. 11, 2015. (Year: 2015).*

Li, Bao-lai et al. CN 107329519 A (Description, machine translation), published Nov. 7, 2017. (Year: 2017).*

Yao, Jiewen, and Vincent J. Zimmer. "White paper: A tour beyond bios launching a STM to monitor SMM in EFI developer kit II. Technical Report". Intel Corporation, 2015. (Year: 2015).*

* cited by examiner

DATA PROCESSING SYSTEM CAPABLE OF PREVENTING SYSTEM TIME FROM BEING TAMPERED IN OFF-LINE STATUS

CROSS-REFERENCE TO RELATED APPLICATION

This utility application claims priority to Taiwan Application Serial Number 111143758, filed Nov. 16, 2022, which is incorporated herein by reference.

BACKGROUND OF THE INVENTION

1. Field of the Invention

The invention relates to a data processing system capable of preventing its own system time from being tampered, and more in particular, to a data processing system which is capable of preventing its own system time from being tampered in an off-line status.

2. Description of the Prior Art

In general, a security application installed in a data processing system will have the function to prevent the system time of the data processing system from being tampered. The main concern is that the authorization date of the security application may be adjusted back to a date before the authorization date by a user. Or it is worried that the data processing system will be invaded by malware and the system time will be adjusted to a date after the authorization date, so that the security application will mistakenly think that the authorization date has already passed and disable the protection function, which will cause a loophole in the information security and hackers can take advantage of the loophole to invade the data processing system.

Generally, a security application installed in a data processing system is linked to a license server via the data processing system over the Internet. The license server records the license period of the security application installed in the data processing system, and can accurately determine whether the license period of the security application installed in the data processing system has expired. Alternatively, the data processing system is linked to a time server via an intranet or a local network, and the security application installed in the data processing system determines whether the license period has expired in accordance with the correct system time transmitted by the time server.

Figure 1:
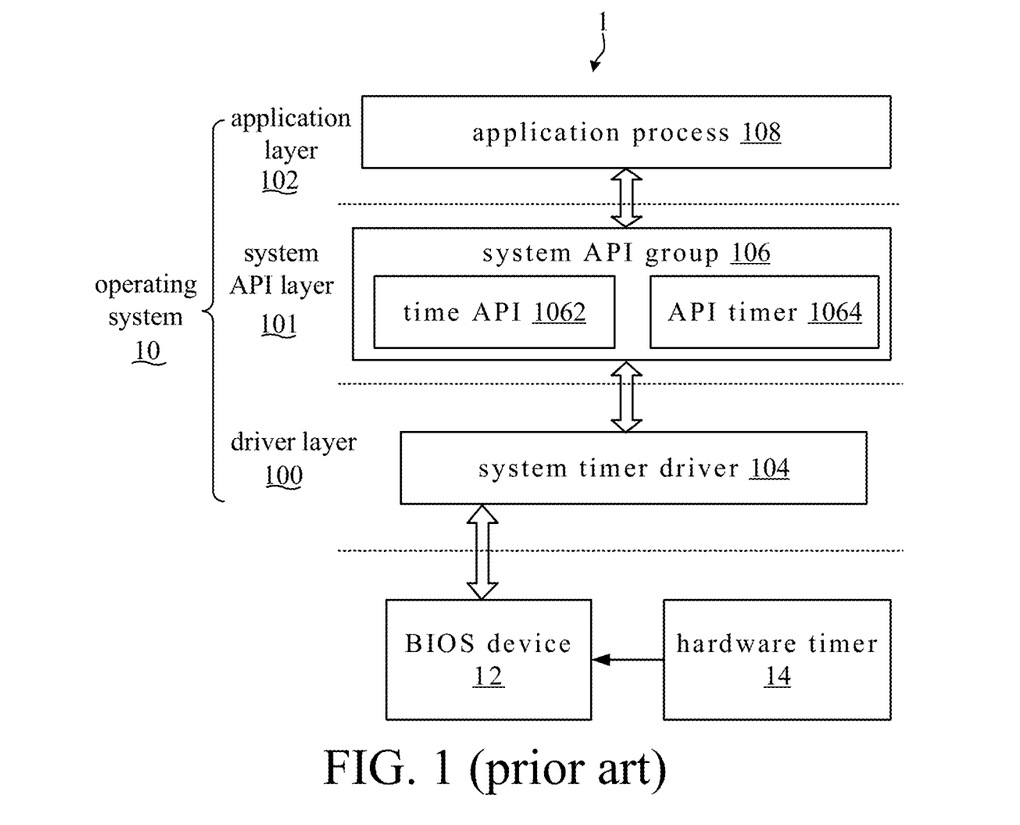
FIG. 1 is a schematic diagram of an architecture regarding a system time of a data processing system of a prior art.

Referring to FIG. 1, FIG. 1 schematically shows an architecture regarding a system time of a data processing system 1 of a prior art. As shown in FIG. 1, the data processing system 1 of the prior art includes a hardware timer 14, a basic input/output system (BIOS) device 12, and at least one processor (not shown in FIG. 1).

The hardware timer 14 is used to output a clock signal. The BIOS device 12 is electrically connected to the hardware timer 14, and is used to receive the clock signal to calculate the current system time.

The at least one processor is electrically connected to the BIOS device 12, and is used to execute an operating system 10. The operating system 10 has a driver layer 100, a system API (application programming interface) layer 101, and an application layer 102. The operating system 10 includes a system timer driver 104 and a system API group 106.

The system timer driver 104 is resident in the driver layer 101 of the operating system 10, and is coupled to the BIOS device 12. The system API group 106 is resident in the system API layer 101 of the operating system 10, and is coupled to the system timer driver 104. The system API group 106 includes a time API 1062 and an API timer 1064. The API timer 1064 sends a request message to the system timer driver 104 at a predetermined time interval. The system timer driver 104 retrieves the current system time from the BIOS device 12 in response to the request message, and uploads the current system time to the system API group 106.

Also as shown in FIG. 1, the operating system 10 also includes an application process 108. The application process 108 is a general application software process, such as Word, Excel, etc. The application process 108 is available to the user after logging into the data processing system 1, and the application process 108 must be closed before the user logs out of the data processing system 1. The application process 108 is executed in the application layer of the operating system 10. The application software process 108 retrieves the current system time through the time API 1062.

Figure 2:
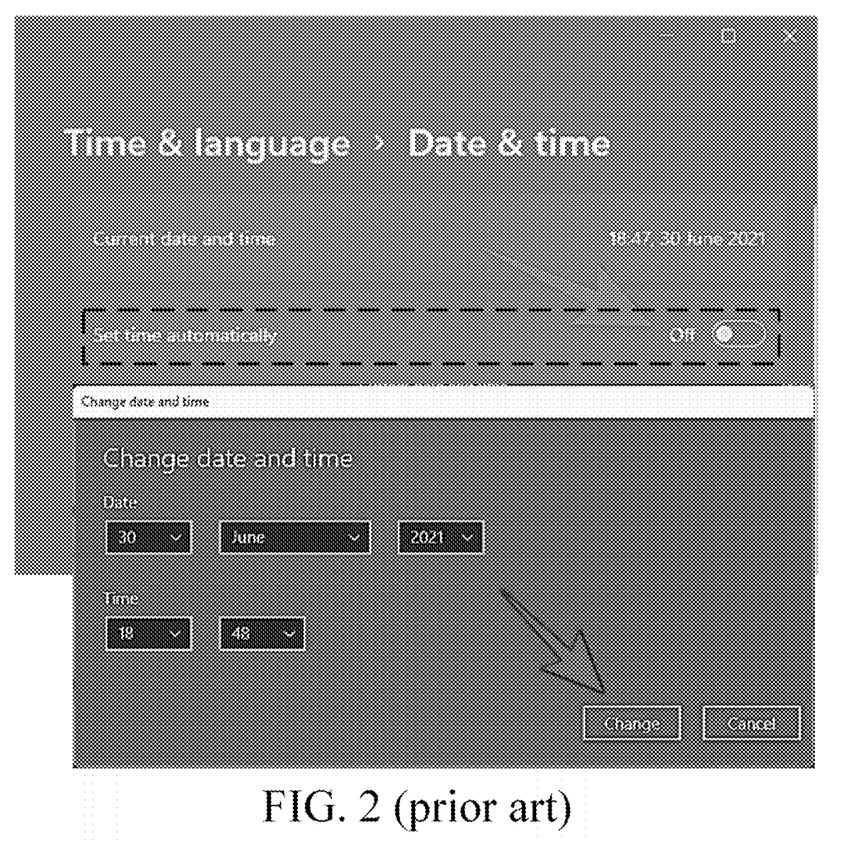
FIG. 2 is a schematic diagram of an example of a screen of a date and time interface provided by an operating system.

If the data processing system 1 of the prior art is in an off-line status, a user could easily tamper the system time of the data processing system 1 of the prior art. Referring to FIG. 2, FIG. 2 shows an example of the screen of the date and time interface provided by the operating system 10. As shown in FIG. 2, the site framed with dotted lines indicates that the user has turned off the automatic time setting feature of the date and time interface, and the change date and time interface pops up to provide the user to change date and time.

Figure 3:
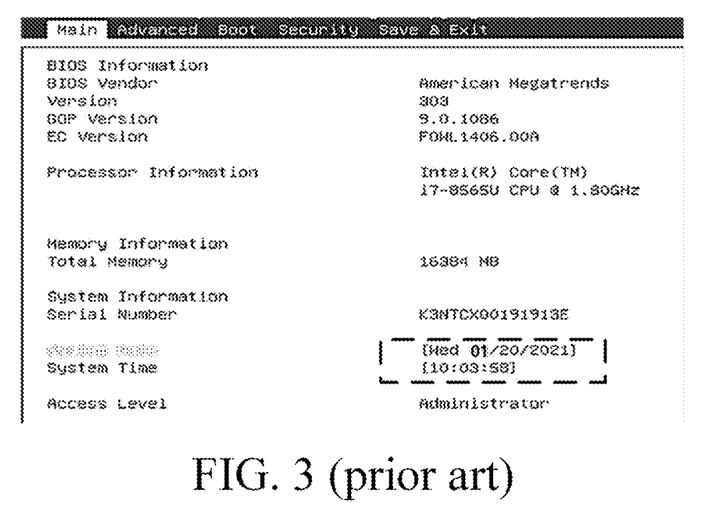
FIG. 3 is a schematic diagram of an example of a screen of a BIOS.

Referring to FIG. 3, FIG. 3 shows an example of the screen of the BIOS. As shown in FIG. 3, a user can enter the BIOS, before operating system 10 is executed, to change the date and time framed with dotted lines in FIG. 3.

In addition, the operating system 10 also includes a service process (not shown in FIG. 1) such as Service (a service process) in Windows OS (operating system), Daemon in Linux OS, etc. These are resident programs. After the operating system is started, the service processes can be executed without login of user via interface. As long as the data processing system 1 is still on, the service processes will continue to run. For example, web site service processes, database service processes, etc., will be executed in the background of operating system 10 regardless of whether the user has logged in or not.

When the general data processing system is powered on, all kinds of programs and processes start up in the following order: BIOS→drivers→service processes→application software processes. When the general data processing system is powered off, all kinds of programs and processes are shut down in the following order: application software processes-→service processes→drivers→BIOS.

When the data processing system 1 of the prior art is in the off-line status, in addition to the user's ability to easily change the system time, it is also possible for malware to compromise the system time during the stages of the startup or shutdown sequences of the various programs and processes described above.

No technology has been proposed to effectively prevent tampering of the system time of a data processing system in an off-line status.

SUMMARY OF THE INVENTION

Accordingly, one scope of the invention is to provide a data processing system which is capable of preventing its own system time from being tampered in an off-line status.

A data processing system according to a preferred embodiment of the invention is in an off-line status, and includes a hardware timer, a BIOS device and at least one processor. The hardware timer functions in outputting a clock signal. The BIOS device is electrically connected to the hardware timer, and functions in receiving the clock signal to calculate a current system time ($t_{cur}$). The at least one processor is electrically connected to the BIOS device, and functions in executing an operating system. The operating system has a driver layer, a system API layer and an application layer. The operating system includes a system timer driver, a time logging driver, a time data storage module, a system API group, and an application layer start/end time recording process. The system timer driver is resident in the driver layer of the operating system, and is coupled to the BIOS device. The time logging driver is resident in the driver layer of the operating system, and is coupled to the system timer driver. When the data processing system is powered on and the time logging driver is loaded by the operating system, the time logging driver records a driver start time (Drv_Start_Time). When the data processing system is powered off and the time logging driver is unloaded by the operating system, the time logging driver records a driver end time (Drv_End_Time). The time data storage module is resident in the driver layer of the operating system, and is coupled to the time logging driver. The time logging driver stores the driver start time (Drv_Start_Time) and the driver end time (Drv_End_Time) in the time data storage module. The system API group is resident in the system API layer of the operating system, and is coupled to the system timer driver. The system API group includes a time API and an API timer. The API timer functions in sending a request message to the system timer driver at a first time interval ($\Delta t_1$). The system timer driver retrieves the current system time ($t_{cur}$) from the BIOS device in response to the request message, and uploads the current system time ($t_{cur}$) to the system API group. The application layer start/end time recording process is executed in the application layer of the operating system, and is coupled to the system API group. When the data processing system is powered on and the application layer start/end time recording process is loaded by the operating system, the application layer start/end time recording process records an application layer start time (App_Start_Time) and requests that the API timer sends a notification message to the application layer start/end time recording process at a second time interval ($\Delta t_2$). The application layer start/end time recording process adds the second time interval ($\Delta t_2$) to the application layer startup time (App_Start_Time) as a self-calculated time ($t_{self}$) whenever the application layer start/end time recording process receives the notification message. The application layer start/end time recording process functions in retrieving the current system time ($t_{cur}$) through the time API and calculating a first time difference between the current system time ($t_{cur}$) and the self-calculated time ($t_{self}$). If the first time difference is greater than a first threshold (Th1), the application layer start/end time recording process adjusts the current system time ($t_{cur}$) calculated by the BIOS device via the time API and the system timer driver to be equal to the self-calculated time ($t_{self}$), or executes a first protection function.

In one embodiment, the application layer start/end time recording process can be a service process or an application software process.

Further, the application layer start/end time recording process calculates a second time difference between the current system time ($t_{cur}$) and the self-calculated time ($t_{self}$) at third time intervals ($\Delta t_3$). And if the second time difference is less than a second threshold (Th2), the application layer start/end time recording process adjusts the self-calculated time ($t_{self}$) to equal the current system time ($t_{cur}$).

Further, when the application layer start/end time recording process is loaded by the operating system, the application layer start/end time recording process retrieves the driver start time (Drv_Start_Time) stored in the time data storage module through the time API, the system timer driver and the time logging driver. The application layer start/end time recording process also judges if the current system time ($t_{cur}$) is greater than the driver start time (Drv_Start_Time) plus a third threshold (Th3), and if YES, the application layer start/end time recording process adjusts the current system time ($t_{cur}$) calculated by the BIOS device via the time API and the system timer driver to be equal to the driver start time (Drv_Start_Time) plus the threshold (Th3), or executes a second protection function.

Further, when the application layer start/end time recording process is loaded by the operating system, the application layer start/end time recording process retrieves the driver end time (Drv_End_Time) stored in the time data storage module through the time API, the system timer driver and the time logging driver. The application layer start/end time recording process also judges if the current system time ($t_{cur}$) is less than the driver end time (Drv_End_Time), and if YES, the application layer start/end time recording process adjusts the current system time ($t_{cur}$) calculated by the BIOS device via the time API and the system timer driver to be equal to the driver end time (Drv_End_Time) or the driver end time (Drv_End_Time) plus a first error value (E1), or executes a third protection function.

Further, when the application layer start/end time recording process is loaded by the operating system, the application layer start/end time recording process retrieves the driver start time (Drv_Start_Time) stored in the time data storage module through the time API, the system timer driver and the time logging driver. The application layer start/end time recording process also judges if the current system time ($t_{cur}$) is less than the driver start time (Drv_Start_Time), and if YES, the application layer start/end time recording process adjusts the current system time ($t_{cur}$) calculated by the BIOS device via the time API and the system timer driver to be equal to the driver start time (Drv_Start_Time) or the driver start time (Drv_Start_Time) plus a second error value (E2), or executes a fourth protection function.

Further, when the data processing system is powered off and the application layer start/end time recording process is unloaded by the operating system, the application layer start/end time recording process records an application layer end time (App_End_Time). The time logging driver records the driver end time (Drv_End_Time), and retrieves the application layer end time (App_End_Time) through the system timer driver and the time API. The time logging driver calculates a third time difference between the driver end time (Drv_End_Time) and the application layer end time (App_End_Time). The time logging driver also judges if the third time difference is greater than a fourth threshold (Th4), and if YES, the time logging driver adjusts the current system time ($t_{cur}$) calculated by the BIOS device via the system timer driver to be equal to the application layer end time (App_End_Time) plus a third error value (E3), or executes a fifth protection function.

Further, when the data processing system is powered off and the application layer start/end time recording process is unloaded by the operating system, the application layer start/end time recording process records an application layer end time (App_End_Time). The time logging driver records the driver end time (Drv_End_Time), and retrieves the application layer end time (App_End_Time) through the system timer driver and the time API. The time logging driver also judges if the driver end time (Drv_End_Time) is less than the application layer end time (App_End_Time), and if YES, the time logging driver adjusts the current system time ($t_{cur}$) calculated by the BIOS device via the system timer driver to be equal to the application layer end time (App_End_Time) plus a fourth error value (E4), or executes a sixth protection function.

Distinguishable from the prior art, the data processing system according to the invention can provide an effective solution to a variety of system time tampered situations. Thereby, artificial extension of the authorization period of the security application can be stopped, and the situation that the security application misjudges that the authorization date has expired and disables the protection function can be avoided.

The advantage and spirit of the invention may be understood by the following recitations together with the appended drawings.

DETAILED DESCRIPTION OF THE INVENTION

Some preferred embodiments and practical applications of this present invention would be explained in the following paragraph, describing the characteristics, spirit, and advantages of the invention.

Figure 4:
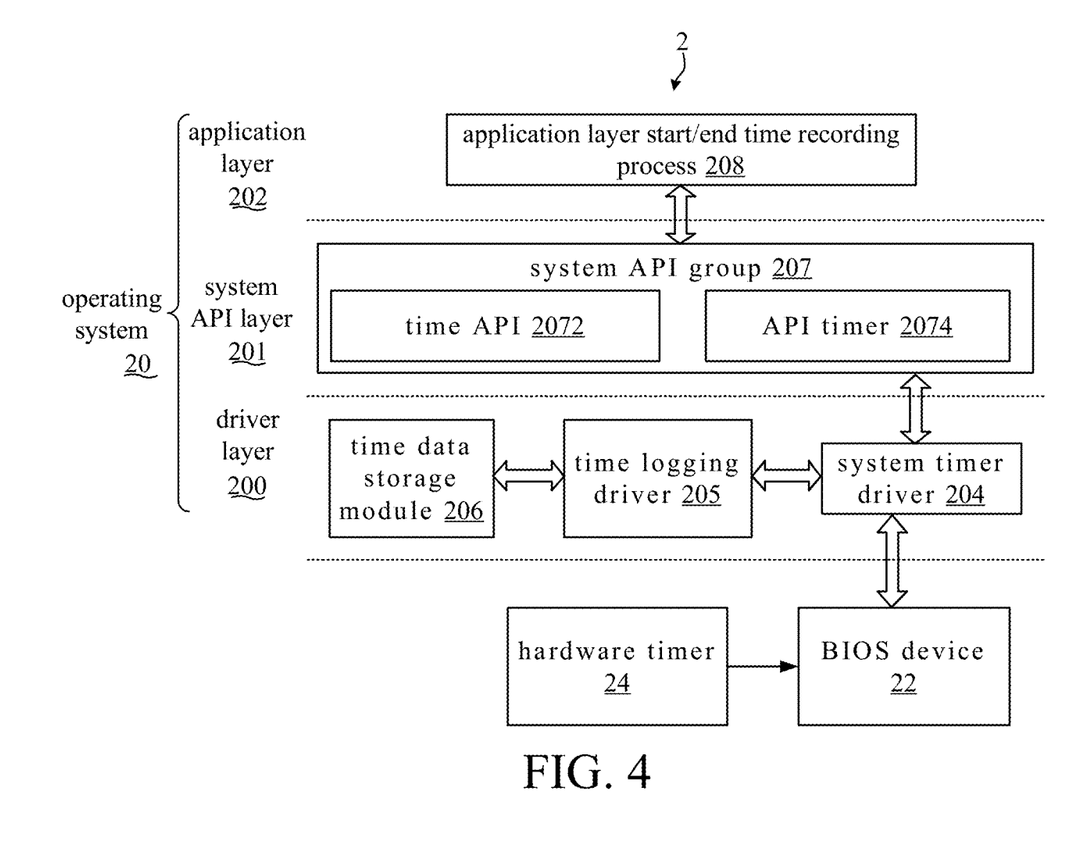
FIG. 4 is a schematic diagram of an architecture regarding the system time of a data processing system according to the preferred embodiment of the invention.

Referring to FIG. 4, the architecture regarding the system time of the data processing system 2 according to the preferred specific embodiment of the invention is shown in FIG. 4. The data processing system 2 according to the preferred embodiment of the invention is in an off-line status.

In one embodiment, the data processing system 2 according to the preferred embodiment of the invention can be one of various data processing systems which each is equipped with a BIOS device, a networking device, and at least one processor for executing an operating system, such as a notebook computer, a desktop computer, a tablet computer, a smart phone, an industrial computer, a server, and the like.

As shown in FIG. 4, the data processing system 2 according to the preferred embodiment of the invention includes a hardware timer 24, a BIOS device 22 and at least one processor (not shown in FIG. 4).

The hardware timer 24 functions in outputting a clock signal. The BIOS device 22 is electrically connected to the hardware timer 24, and functions in receiving the clock signal to calculate a current system time ($t_{cur}$).

The at least one processor is electrically connected to the BIOS device 22, and functions in executing an operating system 20. The operating system 20 has a driver layer 200, a system API layer 201 and an application layer 202. The operating system 20 includes a system timer driver 204, a time logging driver 205, a time data storage module 206, a system API group 207, and an application layer start/end time recording process 208.

The system timer driver 204 is resident in the driver layer 200 of the operating system 20, and is coupled to the BIOS device 22. The time logging driver 205 is resident in the driver layer 200 of the operating system 20, and is coupled to the system timer driver 204. When the data processing system 2 is powered on and the time logging driver 205 is loaded by the operating system 20, the time logging driver 205 records a driver start time (Drv_Start_Time). When the data processing system 2 according to the invention is powered off and the time logging driver 205 is unloaded by the operating system 20, the time logging driver 205 records a driver end time (Drv_End_Time). The time data storage module 206 is resident in the driver layer 200 of the operating system 20, and is coupled to the time logging driver 205. The time logging driver 205 stores the driver start time (Drv_Start_Time) and the driver end time (Drv_End_Time) in the time data storage module 206.

It should be noted that the driver end time (Drv_End_Time) stored in the time data storage module 206 before the time logging driver 205 is unloaded by the operating system 20 is the driver end time (Drv_End_Time) that was recorded by the time logging driver 205 at the last time the time logging driver 205 was unloaded by the operating system 20.

The system API group 207 is resident in the system API layer 201 of the operating system 20, and is coupled to the system timer driver 204. The system API group 207 includes a time API 2072 and an API timer 2074. The API timer 2074 functions in sending a request message to the system timer driver 204 at a first time interval ($\Delta t_1$). In an example, the first time interval ($\Delta t_1$) is equal to 1 second.

The system timer driver 204 retrieves the current system time ($t_{cur}$) from the BIOS device 22 in response to the request message, and uploads the current system time ($t_{cur}$) to the system API group 207. The application layer start/end time recording process 208 is executed in the application layer 202 of the operating system 20, and is coupled to the system API group 207. When the data processing system 2 according to the invention is powered on and the application layer start/end time recording process 208 is loaded by the operating system 20, the application layer start/end time recording process 208 records an application layer start time (App_Start_Time) and requests that the API timer 2074 sends a notification message to the application layer start/end time recording process 208 at a second time interval ($\Delta t_2$). In an example, the second time interval ($\Delta t_2$) is equal to 1 second. The application layer start/end time recording process 208 adds the second time interval ($\Delta t_2$) to the application layer startup time (App_Start_Time) as a self-calculated time ($t_{self}$) whenever the application layer start/end time recording process 208 receives the notification message.

If the authorization period of a security application installed in the data processing system 2 according to the invention is about to expire, the user would like to adjust the current system time ($t_{cur}$) to a date before the expiration date of the authorization period to avoid the expiration of the authorization period such that the user can continue to use the security application. In addition, malware will adjust the current system time (tem) to the authorization expiration date of the security application at the time of operating system startup, so that the security application may mistakenly determine that the authorization expiration date has expired and disable the protection function. The above two scenarios of tampering with the current system time ($t_{cur}$) are collectively referred to as the first condition.

For the first condition, the application layer start/end time recording process 208 functions in retrieving the current system time ($t_{cur}$) through the time API 2072 and calculating a first time difference between the current system time ($t_{cur}$) and the self-calculated time ($t_{self}$). If the first time difference is greater than a first threshold (Th1), the application layer start/end time recording process 208 adjusts the current system time ($t_{cur}$) calculated by the BIOS device 22 via the time API 2072 and the system timer driver 204 to be equal to the self-calculated time ($t_{self}$), or executes a first protection function. In one embodiment, the first protection function may be performed by sending a first alert message, or by locking the display device of the data processing system 2 according to the invention from being operated by the user for a few minutes. The first alert message may be displayed by the display device of the data processing system 2 according to the invention to alert the user.

In one embodiment, the application layer start/end time recording process 208 can be a service process or an application software process. If the application layer start/end time recording process 208 is a service process, the service process can be configured to be automatically executed by the operating system 20 or can be activated by the operation of the user with the data processing system 2 according to the invention. If the application layer start/end time recording process 208 is an application software process, the application software process can be configured to be a boot program, or can be activated by the operation of the user with the data processing system 2 according to the invention.

Further, the application layer start/end time recording process 208 calculates a second time difference between the current system time ($t_{cur}$) and the self-calculated time ($t_{self}$) at third time intervals ($\Delta t_3$). And if the second time difference is less than a second threshold (Th2), the application layer start/end time recording process 208 adjusts the self-calculated time ($t_{self}$) to equal the current system time ($t_{cur}$).

In an example, the third time interval ($\Delta t_3$) is equal to 1 hour, and the second threshold (Th2) is equal to 2 seconds. This scenario is considered to be a cumulative error in time for the notification message from the API timer 2074, herein referred to as the second condition. For the second condition, the application layer activates/deactivates the time logger program 208 only adjusts the self-calculated time ($t_{self}$) to facilitate the detection of tampering with the current system time ($t_{cur}$).

Figure 5:
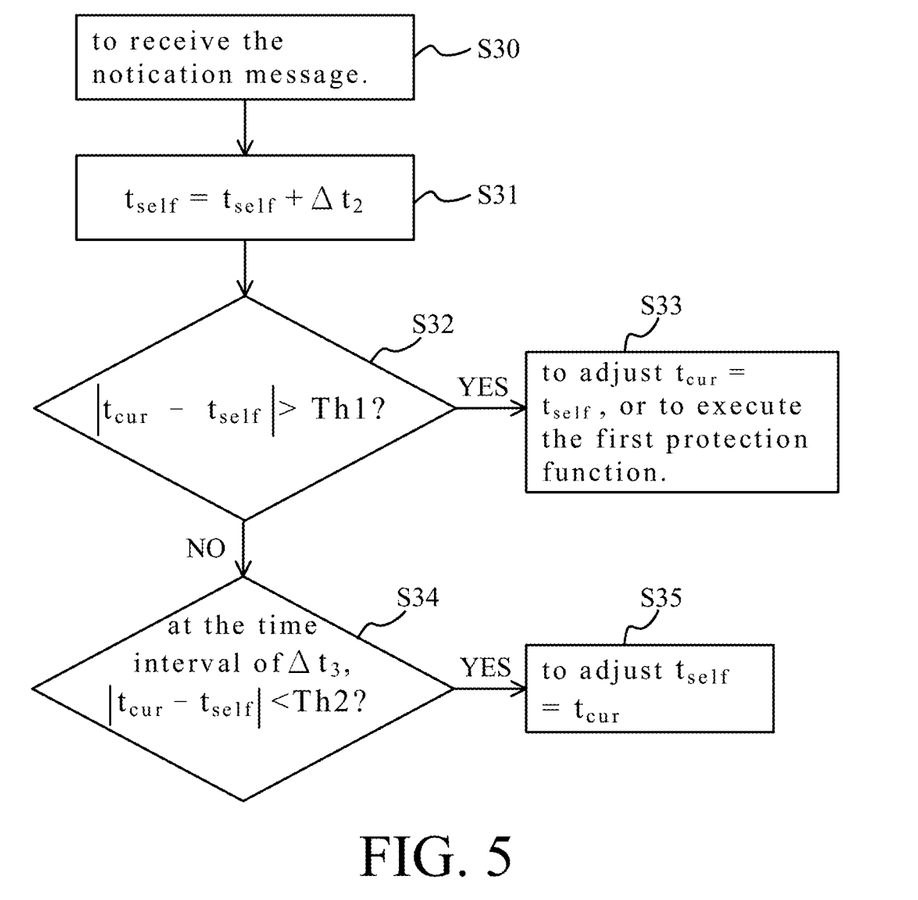
FIG. 5 is a flowchart of the data processing system according to the preferred embodiment of the invention executing the operation system for the first condition and the second condition.

Referring to FIG. 5, FIG. 5 is a flowchart of the data processing system 2 according to the preferred embodiment of the invention executing the operation system 20 for the first condition and the second condition.

As shown in FIG. 5, after been running for some time, the operating system 20 firstly performs step S30 to receive the notification message. Next, step S31 is performed to calculate $t_{self} = t_{self} + \Delta t_2$.

Then, step S32 is performed to judge if $|t_{cur} - t_{self}|$ is larger than the first threshold (Th1). If the judgment result of step S32 is positive, step S33 is performed to adjust $t_{cur} = t_{self}$.

If the judgment result of step S32 is negative, step S34 is performed to judge if $|t_{cur} - t_{self}|$ is less than the second threshold (Th2) eat the time interval of $\Delta t_3$.

If the judgment result of step S34 is positive, step S35 is performed to adjust $t_{self} = t_{cur}$.

If a general data processing system is compromised by a malicious service process, the malicious service process may adjust the system time backward before the service processes of the operating system start. This scenario allows the difference between the tampered system time and this time that the operating system loads the drivers to be greater than 30 minutes or more, which is referred to as the third condition.

Further, when the application layer start/end time recording process 208 is loaded by the operating system 20, the application layer start/end time recording process 208 retrieves the driver start time (Drv_Start_Time) stored in the time data storage module 206 through the time API 2072, the system timer driver 204 and the time logging driver 205. For the third condition, the application layer start/end time recording process 208 also judges if the current system time ($t_{cur}$) is greater than the driver start time (Drv_Start_Time) plus a third threshold (Th3), and if YES, the application layer start/end time recording process 208 adjusts the current system time ($t_{cur}$) calculated by the BIOS device 22 via the time API 2072 and the system timer driver 204 to be equal to the driver start time (Drv_Start_Time) plus the threshold (Th3), or executes a second protection function. In an example, the third threshold (Th3) is equal to 5 minutes. In one embodiment, the second protection function may be performed by sending a second alert message or by locking the display device of the data processing system 2 according to the invention from being operated by the user for a few minutes. The second alert message may be displayed by the display device of the data processing system 2 according to the invention to alert the user.

If a user installs a malicious service process in a general data processing system by himself, the malicious service process starts before the service processes start on an operating system executed in the general data processing system. If it is because the authorization expiration date of a security application installed in the general data processing system is approaching, the user may take advantage of this malicious service process to adjust the system time before the expiration date of the authorization period to avoid the expiration of the authorization period such that the user can continue to use the security application. This scenario will inevitably allow the tampered system time to be before this time that the last data processing system is powered off, which is referred to herein as the fourth condition.

Further, when the application layer start/end time recording process 208 is loaded by the operating system 20, the application layer start/end time recording process 208 retrieves the driver end time (Drv_End_Time) stored in the time data storage module 206 through the time API 2072, the system timer driver 204 and the time logging driver 205. At this time, the driver end time (Drv_End_Time) stored in the time data storage module 206 is the driver end time (Drv_End_Time) recorded by the time logging driver 205 when the time logging driver 205 was last unloaded by the operating system 20.

For the fourth condition, the application layer start/end time recording process 208 also judges if the current system time ($t_{cur}$) is less than the driver end time (Drv_End_Time), and if YES, the application layer start/end time recording process 208 adjusts the current system time ($t_{cur}$) calculated by the BIOS device 22 via the time API 2072 and the system timer driver 204 to be equal to the driver end time (Drv_End_Time) or the driver end time (Drv_End_Time) plus a first error value (E1), or executes a third protection function. In one embodiment, the third protection function may be performed by sending a third alert message or by locking the display device of the data processing system 2 according to the invention from being operated by the user for a few minutes. The third alert message may be displayed by the display device of the data processing system 2 according to the invention to alert the user.

It is also possible that a malicious service process will adjust the system time forward before the service processes of the operating system start. This scenario allows the tampered system time to be earlier than the time when the operating system loads the drivers, which is referred to here as the fifth condition.

Further, when the application layer start/end time recording process 208 is loaded by the operating system 20, the application layer start/end time recording process 208 retrieves the driver start time (Drv_Start_Time) stored in the time data storage module 206 through the time API 2072, the system timer driver 204 and the time logging driver 205. For the fifth condition, the application layer start/end time recording process 208 also judges if the current system time ($t_{cur}$) is less than the driver start time (Drv_Start_Time), and if YES, the application layer start/end time recording process 208 adjusts the current system time ($t_{cur}$) calculated by the BIOS device 22 via the time API 2072 and the system timer driver 204 to be equal to the driver start time (Drv_Start_Time) or the driver start time (Drv_Start_Time) plus a second error value (E2), or executes a fourth protection function. In one embodiment, the fourth protection function may be performed by sending a fourth alert message or by locking the display device of the data processing system 2 according to the invention from being operated by the user for a few minutes. The fourth alert message may be displayed by the display device of the data processing system 2 according to the invention to alert the user.

If a general data processing system is compromised by a malicious service process. The malicious service process may adjust the system time backward after the service processes of the operating system are closed. This scenario makes the difference between the time when the operating system unloads the drivers and the time when the operating system closes the service processes to be more than 30 minutes, which is called the sixth condition here.

Further, when the data processing system 2 is powered off and the application layer start/end time recording process 208 is unloaded by the operating system 20, the application layer start/end time recording process 208 records an application layer end time (App_End_Time). The time logging driver 205 records the driver end time (Drv_End_Time), and retrieves the application layer end time (App_End_Time) through the system timer driver 204 and the time API 2072. For the sixth condition, the time logging driver 205 calculates a third time difference between the driver end time (Drv_End_Time) and the application layer end time (App_End_Time). The time logging driver 205 also judges if the third time difference is greater than a fourth threshold (Th4), and if YES, the time logging driver 205 adjusts the current system time ($t_{cur}$) calculated by the BIOS device 22 via the system timer driver 204 to be equal to the application layer end time (App_End_Time) plus a third error value (E3), or executes a fifth protection function. In an example, the fourth threshold (Th4) is equal to 5 minutes. In one embodiment, the fifth protection function may be performed by sending a fifth alert message or by locking the display device of the data processing system 2 according to the invention from being operated by the user for a few minutes. The fifth alert message may be displayed by the display device of the data processing system 2 according to the invention to alert the user.

If a user installs a malicious service process in a general data processing system by himself, the malicious service process closes after all service processes of the operating system have closed. The user may take advantage of this malicious service process to reset the system time to before the authorization expiration date of a security application installed in the general data processing system after all service processes of the operating system are closed to avoid the expiration of the authorization period such that the user can continue to use the security application. This scenario will inevitably cause the time that the drivers are closed before the time that the service processes are closed, which is referred to herein as the seventh condition.

Further, when the data processing system 2 is powered off and the application layer start/end time recording process 208 is unloaded by the operating system 20, the application layer start/end time recording process 208 records an application layer end time (App_End_Time). The time logging driver 205 records the driver end time (Drv_End_Time), and retrieves the application layer end time (App_End_Time) through the system timer driver 204 and the time API 2072. For the seventh condition, the time logging driver 205 also judges if the driver end time (Drv_End_Time) is less than the application layer end time (App_End_Time), and if YES, the time logging driver 205 adjusts the current system time ($t_{cur}$) calculated by the BIOS device 22 via the system timer driver 204 to be equal to the application layer end time (App_End_Time) plus a fourth error value (E4), or executes a sixth protection function. In one embodiment, the sixth protection function may be performed by sending a sixth alert message or by locking the display device of the data processing system 2 according to the invention from being operated by the user for a few minutes. The sixth alert message may be displayed by the display device of the data processing system 2 according to the invention to alert the user.

Figure 6:
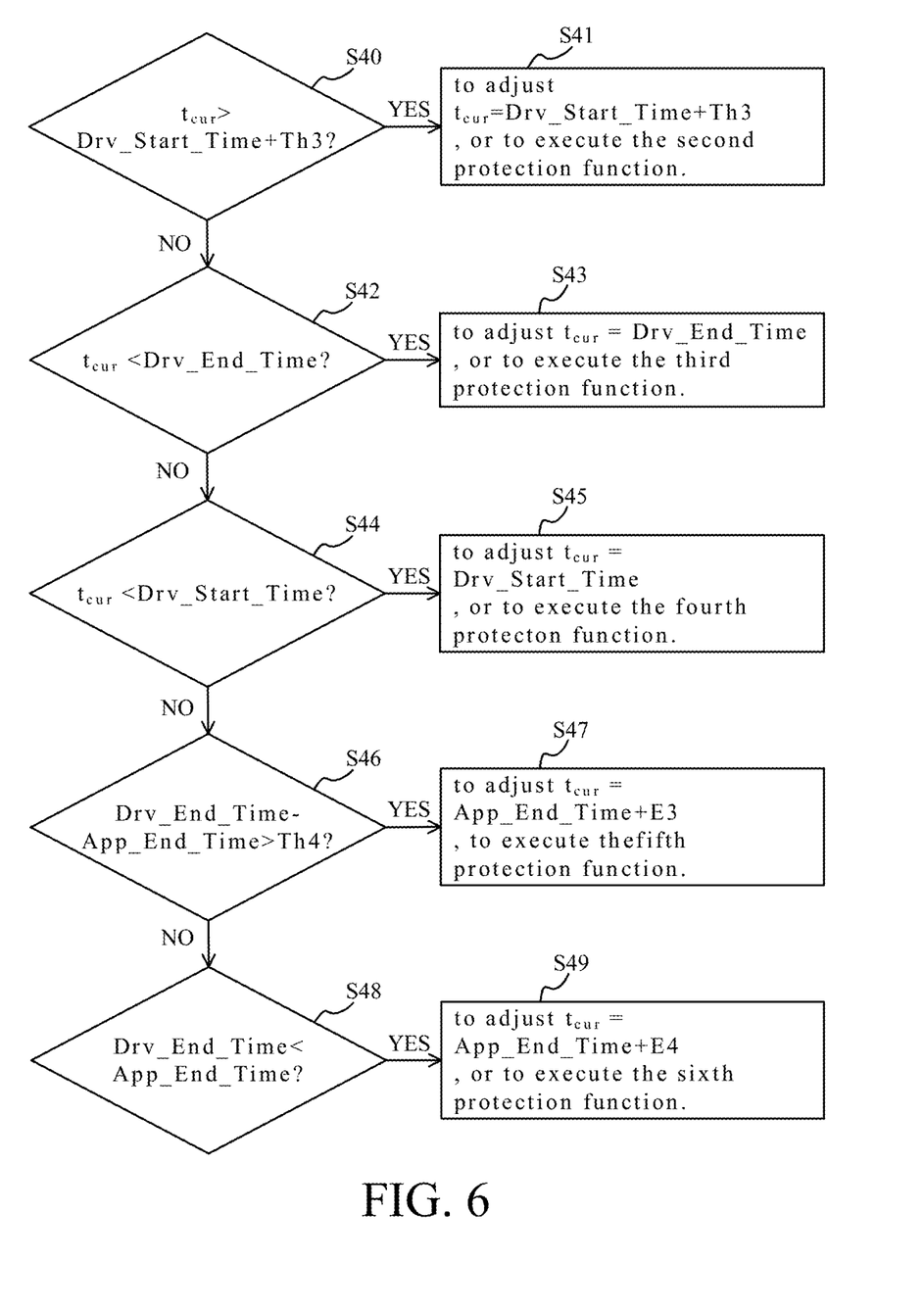
FIG. 6 is a flowchart of the data processing system according to the preferred embodiment of the invention executing the operation system for form the third condition to the seventh condition.

Referring to FIG. 6, FIG. 6 is a flowchart of the data processing system 2 according to the preferred embodiment of the invention executing the operation system 20 for form the third condition and the seventh condition.

As shown in FIG. 6, the operating system 20 performs step S40 to judge if $t_{cur}$ is greater than Drv_Start_Time+Th3. If the judgment result of step S40 is positive, step S41 is performed to adjust $t_{cur}$=Drv_Start_Time+Th3.

If the judgment result of step S40 is negative, step S42 is performed to judge if $t_{cur}$ is less than Drv_End_Time. If the judgment result of step S42 is positive, step S43 is performed to adjust $t_{cur}$=Drv_End_Time, or to adjust $t_{cur}$=Drv_End_Time+E1.

If the judgment result of step S42 is negative, step S44 is performed to judge if $t_{cur}$ is less than Drv_Start_Time. If the judgment result of step S44 is positive, step S45 is performed to adjust $t_{cur}$=Drv_Start_Time, or to adjust $t_{cur}$=Drv_Start_Time+E2.

If the judgment result of step S44 is negative, step S46 is performed to judge if Drv_End_Time−App_End_Time is greater than the fourth threshold value (Th4). If the judgment result of step S46 is positive, step S47 is performed to adjust $t_{cur}$=App_End_Time+E3.

If the judgment result of step S46 is negative, step S48 is performed to judge if Drv_End_Time is less than App_End_Time. If the judgment result of step S48 is positive, step S49 is performed to adjust $t_{cur}$=App_End_Time+E4.

With the detailed description of the above preferred embodiments of the invention, it is clear to understand that the data processing system according to the invention can provide an effective solution to a variety of system time tampered situations. Thereby, artificial extension of the authorization period of the security application can be stopped, and the situation that the security application misjudges that the authorization date has expired and disables the protection function can be avoided.

With the example and explanations above, the characteristics and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A data processing system in an off-line status, comprising:
   a hardware timer, for outputting a clock signal;
   a BIOS (basic input/output system) device, being electrically connected to the hardware timer and functioning in receiving the clock signal to calculate a current system time; and
   at least one processor, being electrically connected to the BIOS device and functioning in executing an operating system, the operating system having a driver layer, a system API (application programming interface) layer and an application layer, and comprising:
   a system timer driver, resident in the driver layer and coupled to the BIOS device;
   a time logging driver, resident in the driver layer and coupled to the system timer driver, wherein when the data processing system is powered on and the time logging driver is loaded by the operating system, the time logging driver records a driver start time, when the data processing system is powered off and the time logging driver is unloaded by the operating system, the time logging driver records a driver end time;
   a time data storage module, resident in the driver layer and coupled to the time logging driver, wherein the time logging driver stores the driver start time and the driver end time in the time data storage module;
   a system API group, resident in the system API layer and coupled to the system timer driver, the system API group comprising:
   a time API; and
   an API timer, for sending a request message to the system timer driver at a first time interval, wherein the system timer driver retrieves the current system time from the BIOS device in response to the request message, and uploads the current system time to the system API group; and
   an application layer start/end time recording process, executed in the application layer and coupled to the system API group,
   when the data processing system is powered on and the application layer start/end time recording process is loaded by the operating system, the application layer start/end time recording process recording an application layer start time and requesting that the API timer sends a notification message to the application layer start/end time recording process at a second time interval, and the application layer start/end time recording process adding the second time interval to the application layer start time as a self-calculated time whenever the application layer start/end time recording process receives the notification message;
   the application layer start/end time recording process functioning in retrieving the current system time through the time API, and calculating a first time difference between the current system time and the self-calculated time, if the first time difference is greater than a first threshold, the application layer start/end time recording process adjusting the current system time calculated by the BIOS device via the time API and the system timer driver to be equal to the self-calculated time, or executing a first protection function.

2. The data processing system of claim 1, wherein the application layer start/end time recording process is a service process or an application software process.

3. The data processing system of claim 2, wherein the application layer start/end time recording process calculates a second time difference between the current system time and the self-calculated time at third time intervals, and if the second time difference is less than a second threshold, the application layer start/end time recording process adjusts the self-calculated time to equal the current system time.

4. The data processing system of claim 2, wherein when the application layer start/end time recording process is loaded by the operating system, the application layer start/end time recording process retrieves the driver start time stored in the time data storage module through the time API, the system timer driver and the time logging driver, the application layer start/end time recording process judges if the current system time is greater than the driver start time plus a third threshold, and if YES, the application layer start/end time recording process adjusts the current system time calculated by the BIOS device via the time API and the system timer driver to be equal to the driver start time plus the third threshold, or executes a second protection function.

5. The data processing system of claim 2, wherein when the application layer start/end time recording process is loaded by the operating system, the application layer start/end time recording process retrieves the driver end time stored in the time data storage module through the time API, the system timer driver and the time logging driver, the application layer start/end time recording process judges if the current system time is less than the driver end time, and if YES, the application layer start/end time recording process adjusts the current system time calculated by the BIOS device via the time API and the system timer driver to be equal to the driver end time or the driver end time plus a first error value, or executes a third protection function.

6. The data processing system of claim 2, wherein when the application layer start/end time recording process is loaded by the operating system, the application layer start/end time recording process retrieves the driver start time stored in the time data storage module through the time API, the system timer driver and the time logging driver, the application layer start/end time recording process judges if the current system time is less than the driver start time, and if YES, the application layer start/end time recording process adjusts the current system time calculated by the BIOS device via the time API and the system timer driver to be equal to the driver start time or the driver start time plus a second error value, or executes a fourth protection function.

7. The data processing system of claim 2, wherein when the data processing system is powered off and the application layer start/end time recording process is unloaded by the operating system, the application layer start/end time recording process records an application layer end time, the time logging driver records the driver end time, and retrieves the application layer end time through the system timer driver and the time API, the time logging driver calculates a third time difference between the driver end time and the application layer end time, the time logging driver judges if the third time difference is greater than a fourth threshold, and if YES, the time logging driver adjusts the current system time calculated by the BIOS device via the system timer driver to be equal to the application layer end time plus a third error value, or executes a fifth protection function.

8. The data processing system of claim 2, wherein when the data processing system is powered off and the application layer start/end time recording process is unloaded by the operating system, the application layer start/end time recording process records an application layer end time, the time logging driver records the driver end time, and retrieves the application layer end time through the system timer driver and the time API, the time logging driver judges if the driver end time is less than the application layer end time, and if YES, the time logging driver adjusts the current system time calculated by the BIOS device via the system timer driver to be equal to the application layer end time plus a fourth error value, or executes a sixth protection function.

\* \* \* \* \*